Sept. 22, 1959   S. R. HOTARD   2,904,826
CARCASS SPLITTING MACHINE
Filed Nov. 29, 1957   2 Sheets-Sheet 1

INVENTOR.
SEPTIME R. HOTARD,
BY
McMorrow, Berman + Davidson
ATTORNEYS.

Sept. 22, 1959     S. R. HOTARD     2,904,826
CARCASS SPLITTING MACHINE
Filed Nov. 29, 1957     2 Sheets-Sheet 2
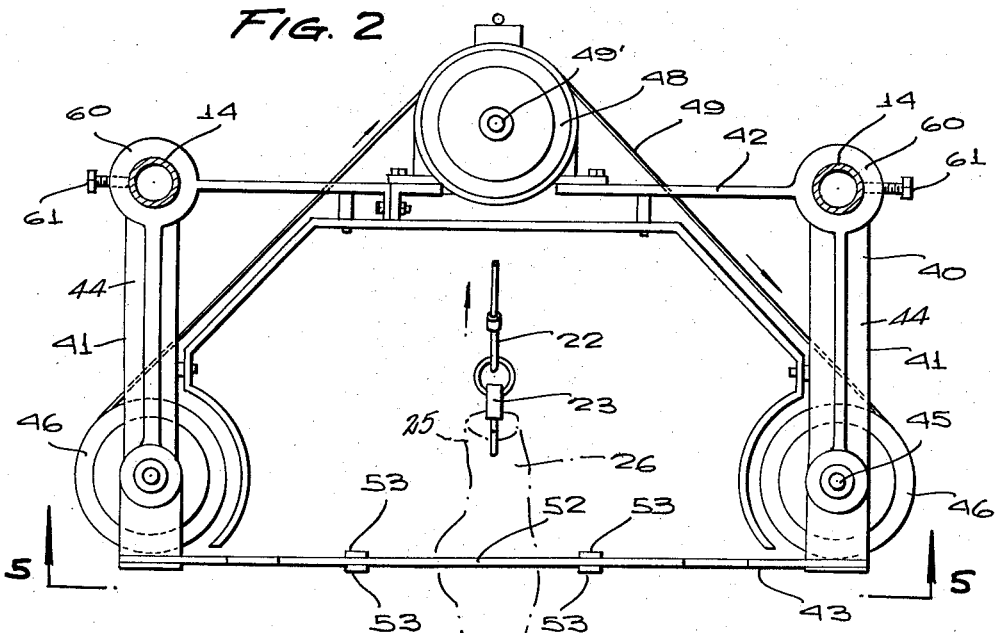
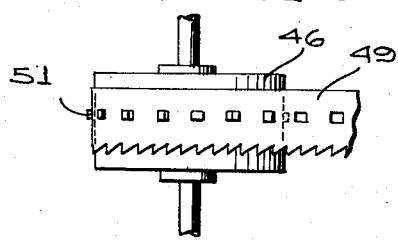
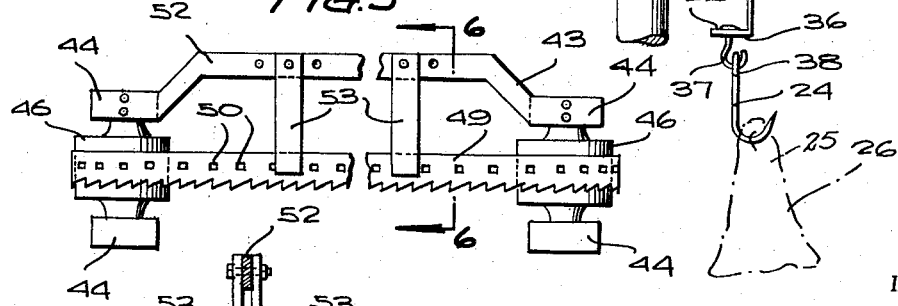
INVENTOR
SEPTIME R. HOTARD
BY McMorrow, Berman + Davidson
ATTORNEYS

United States Patent Office 2,904,826
Patented Sept. 22, 1959

2,904,826
CARCASS SPLITTING MACHINE
Septime R. Hotard, Gainesville, Fla.

Application November 29, 1957, Serial No. 699,804

2 Claims. (Cl. 17—23)

This invention relates to butchering apparatus, and more particularly to an apparatus for splitting a carcass vertically while the carcass is suspended from an overhead support.

The main object of the invention is to provide a novel and improved carcass splitting machine which is simple in construction, which is easy to operate, and which provides a means for splitting a carcass vertically in a rapid and efficient manner and with the expenditure of a minimum amount of human labor.

A further object of the invention is to provide an improved carcass splitting machine which involves inexpensive parts, which is durable in construction, which operates to cut a carcass into two sides in a neat, efficient and precise manner directly along the vertical center line of the carcass, and which is provided with means for facilitating the subsequent removal of the severed sides.

Further objects and advantages of the invention will become apparent from the following description and claims, and from the accompanying drawings, wherein:

Figure 2 is an enlarged horizontal cross sectional view taken on the line 2—2 of Figure 1.

Figure 3 is an enlarged side elevational detail view showing one of the band saw pulleys and a portion of the band saw engaged thereon, as employed in the machine of Figures 1 and 2.

Figure 4 is an enlarged vertical cross sectional detail view taken transversely through one of the longitudinal guide rail elements employed in the machine of Figures 1 and 2 for supporting the side of a carcass after it has been severed and for transporting the side longitudinally from the splitting machine.

Figure 5 is a fragmentary elevational view taken on the line 5—5 of Figure 2.

Figure 6 is a transverse vertical cross sectional view taken on the line 6—6 of Figure 5.

Figure 1:
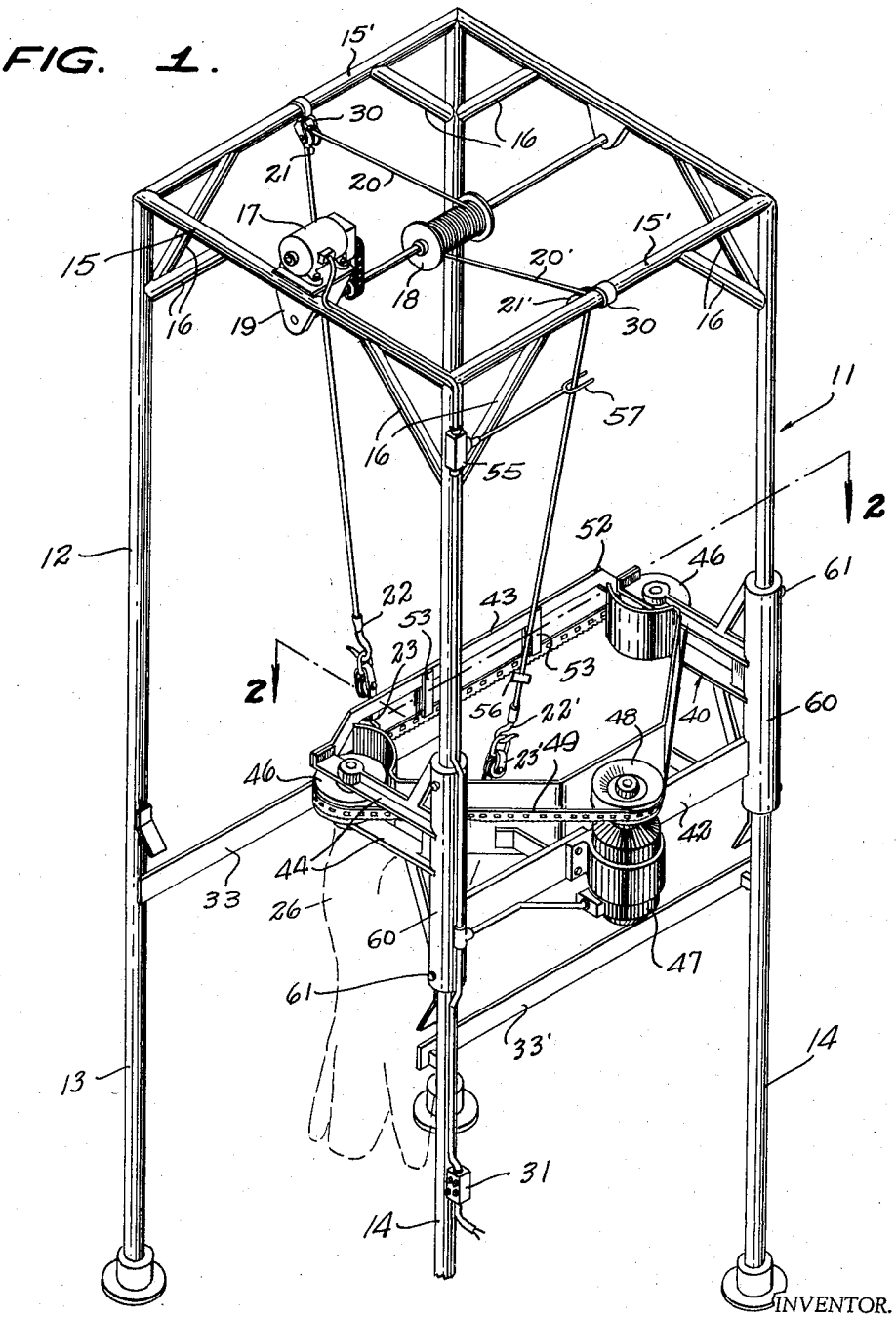
Figure 1 is a fragmentary perspective view of an improved carcass splitting machine constructed in accordance with the present invention.

Referring to the drawings, the butchering apparatus is designated generally at 11 and comprises an upstanding frame 12 of generally rectangular shape, said frame comprising a plurality of vertical supports 13 and 14 located on the opposite sides of the frame and connected at their top ends by the longitudinal bars 15' and the horizontal cross bars 15, said longitudinal bars and cross bars being rigidly braced to the vertical supports 13 and 14 by diagonal brace rods 16. The frame 12 thus may comprise at least two vertical support bars 13 and 14 at each side of the frame, the vertical rods being rigidly connected by the horizontal cross bars 15 and longitudinal bars 15', and said bars being fastened in any suitable manner so as to define a unitary rigid framework.

Mounted in any suitable manner substantially centrally on a cross bar 15 of the aforesaid framework is an electric motor 17 which is drivingly coupled to a hoist reel 18 journaled in suitable supports depending from the central portions of the cross bars 15, for example, supports 19.

Wound on the hoist reel 18 are the respective hoist cables 20 and 20', said cables extending from opposite sides of the reel, as shown in Figure 1, the cables passing over respective supporting pulleys 21 and 21' suitably journaled in respective pairs of depending supports 30 provided at the intermediate portions of the opposite longitudinal bars 15' of the frame 12. Secured to the ends of the hoist cables 20 and 20' are the respective hook members 22 and 22' which detachably engage respective carcass-engaging members 23, 23', each of said members including a pivoted hook 24 adapted to be engaged with a respective rear leg 25 of a carcass 26, as shown in dotted view in Figure 4, whereby to support the carcass with its vertical center line in the longitudinal vertical central plane of the frame 12, and whereby to elevate the carcass vertically and maintain the carcass center line in said longitudinal vertical plane responsive to the winding up of the cables 20 and 20' on the hoist reel 18, namely, responsive to the energization of the hoist motor 17.

The motor 17 is energized from a suitable current supply through a control switch contained in a switch box 31 secured to one of the vertical support bars 14.

Secured inwardly adjacent the respective vertical support bars 13 and 14 are respective longitudinal guide rails 33, 33', said guide rails leading to locations for further processing of the sides of the carcass after they have been severed. Each of the carcass-engaging assemblies 23 and 23' comprises a bracket member 34 formed with a U-bend at its upper portion, shown at 35, adapted to be engaged by a cable hook 22 or 22', as shown in Figure 4. The lower end of each bracket member 34 comprises a horizontally extending arm portion 36 to which is fastened a depending hook member 37 which engages through an eye loop portion 38 formed on the top end of the associated hook element 24, whereby said hook element 24 is pivotally connected to the hook member 37. Journaled between the side arms of the loop end 35 of each bracket member 34 is a supporting pulley 39 engageable on the top edge of a guide rail 33 or 33', whereby a severed carcass side may be supported for longitudinal movement on the guide rail after the splitting operation, as will be presently described.

Designated at 40 is a generally rectangular band saw frame which is secured to the vertical bars 14, 14 and which projects inwardly, substantially to the longitudinal vertical center plane of frame 12. The rectangular band saw frame 40 comprises the transverse arms 41, 41, the outer longitudinal arm 42, and an inner longitudinal arm 43 extending in the longitudinal vertical center plane of frame 12.

The transverse arms 41 comprise top and bottom sections 44, 44 and journaled in the ends of the arm sections 44, 44 are respective vertical shafts 45 to which are secured respective band saw support pulleys 46, 46, said pulleys being located between the ends of the arm sections 44, 44, as is clearly shown in Figure 5.

Secured to the intermediate portion of the outer longitudinal arm 42 of band saw frame 40 is an electric motor 47, said motor being mounted vertically and having a band saw drive pulley 48 secured to its shaft 49, the pulley 48 being in the same horizontal plane as the band saw support pulleys 46, 46. Designated at 49 is a band saw blade which is engaged on the respective pulleys 48, 46, 46, as shown in Figure 2, the band saw being formed with longitudinally spaced square apertures 50 which are engaged by sprocket pin elements 51 similarly spaced and projecting outwardly from the peripheries of the respective pulleys 48, 46, 46, whereby the band saw is retained on the pulleys and is positively driven by the motor pulley 48.

The blade 49 is supported with its teeth facing downwardly and with its inner portion extending in the longitudinal vertical central plane of frame 12. The inner arm 43 of the band saw frame 40 includes the upwardly offset intermediate portion 52, and secured to said intermediate portion 52 are the respective pairs of depending guide arms 53, 53 extending adjacent the upper portions of the band saw blade 49 at the opposite sides thereof, as shown in Figure 6, and serving to stabilize the blade and to prevent the blade from being laterally deviated.

As shown in Figure 5, the guide arms 53 are located symmetrically relative to the midpoint of the longitudinal band saw portion, namely, are spaced substantially equal distances from the respective supporting pulleys 46, 46. As shown in Figure 2, the respective pairs of depending guide arms 53, 53 are spaced apart by a sufficient distance to easily allow a carcass 26 to pass upwardly between the pairs of depending arms 53, 53 during the splitting operaion.

The electric motor 17 is connected to a suitable power supply source through a normally closed limit switch 55 mounted on one of the vertical supports 14 and through a manually controlled switch contained in the switch box 31. Secured on the cable 20' is a stop collar 56 engageable with an inwardly projecting operating arm 57 provided on the limit switch 55, whereby switch 55 is opened responsive to the engagement of the stop collar 56 with the operating arm 57, namely, when the hoist cables 20 and 20' have been elevated a predetermined amount by the hoist reel 18, said amount being sufficient to substantially sever the carcass 26 by the engagement thereof with the longitudinal inner portion of the band saw blade 49.

The band saw frame 40 is mounted on the vertical supports 14, 14 in a manner allowing for vertical adjustment of the frame 40, in accordance with the size of the carcasses to be split. Thus, the frame 40 is provided with sleeve elements 60 which receive the vertical support members 14, as shown in Figure 2, said sleeve elements being provided with set screws 61 which clampingly engage the support members 14, but which may be released to allow the frame 40 to be vertically adjusted on the supports.

The band saw motor 47 is connected to the current supply source through a suitable manually controlled switch provided in the switch box 31.

In operation, the carcass 26 is secured to the carcass supporting members 23, 23' by engaging the hook elements 24 of said members with the rear legs 25 of the carcass, as shown in Figure 2, the cable hooks 22, 22' being engaged with the U-bends 35 of the supports 23, 23', whereby the carcass will be elevated responsive to the energization of the motor 17. Thus, the carcass is first elevated to the position thereof shown in dotted view in Figure 1, wherein the carcass has its center line substantially in vertical alignment with the inner, longitudinally extending portion of the band saw blade 49. The band saw motor 47 is then energized, after which the control switch for the hoist motor 17 is closed to energize said motor and to cause the cables 20 and 20' to be wound up on the hoist reel 18. The carcass 26 is thus elevated against the band saw blade and is vertically split as the carcass is raised. When the stop collar 56 engages the arm 57, the limit switch 55 is opened, deenergizing the hoist motor 17, and allowing the sides of the carcass to be swung adjacent the respective sides of the frame 12, whereby the sides may be lowered and whereby the supports 23 and 23' may be engaged on the guide rails 33, 33'. The hooks 22, 22' may then be detached from the supports 23, 23', allowing the sides of the carcass to be transferred along the guide rails 33, 33' to positions for processing.

As will be readily understood, the band saw frame 40 is adjusted to a position such that the largest carcass is completely severed when the limit switch opens. When the limit switch 55 opens, the manual switch associated with the motor 17 may be likewise opened so that the motor 17 will not again become energized until manually closed for splitting the next carcass. After the carcass is completely severed, the respective sides swing by gravity to positions adjacent the sides of the frame 12, whereupon the sides may be lowered sufficiently to allow the supports 23, 23' to supportingly engage on the respective guide rails 33 and 33', after which the hooks 22 and 22' may be detached from the supports 23, 23'.

If so desired, the motor 17 and its associated circuit may be omitted and the hoist reel 18 may be driven by suitable transmission means, such as suitable gearing or drive pulley means, from the motor 47. The stop switch 55 may then be employed in the circuit of motor 47.

While a specific embodiment of an improved butchering apparatus for splitting a carcass vertically has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A butchering apparatus for splitting a carcass vertically comprising a frame including a pair of vertical supports at one side of the frame, a horizontal band saw frame secured to said supports and extending into the first-named frame, a horizontal, endless band saw blade mounted on said band saw frame, pulley means journaled on said band saw frame and being formed and arranged to support said band saw blade in a generally triangular configuration with its teeth facing downwardly for movement on said band saw frame with a portion of the blade extending longitudinally of the first-named frame, drive means coupled to said pulley means, a cable hoist reel journaled on said first-named frame over said blade portion, a pair of cables wound on said reel in the same direction and extending from opposite sides of the reel, means supporting said cables on opposite sides of the vertical longitudinal plane of said blade portion, respective carcass-engaging members secured to the ends of said cables and being formed and arranged to elevate a carcass against said blade portion responsive to rotation of said cable hoist reel, drive means coupled to said hoist reel, and cooperating means on the first-named frame and on one of the cables formed and arranged to deenergize said last-named drive means responsive to a predetermined amount of elevation of said one of the cables relative to said band saw frame.

2. A butchering apparatus for splitting a carcass vertically comprising a frame including a pair of vertical supports at one side of the frame, a horizontal band saw frame secured to said supports and extending into the first-named frame, a horizontal, endless band saw blade mounted on said band saw frame, pulley means journaled on said band saw frame and being formed and arranged to support said band saw blade in a generally triangular configuration with its teeth facing downwardly for movement on said band saw frame with a portion of the blade extending longitudinally of the first-named frame, said blade being formed with longitudinally uniformly spaced apertures and said pulley means being provided with outwardly projecting sprocket lugs engageable in said apertures, drive means coupled to said pulley means, a cable hoist reel journaled on said first-named frame over said blade portion, a pair of cables wound on said reel in the same direction and extending from opposite sides of the reel, means supporting said cables on opposite sides of the vertical longitudinal plane of said blade portion, respective carcass-engaging members secured to the ends of said cable and being formed and arranged to elevate a carcass against said blade portion responsive to rotation of said cable hoist reel, drive means coupled to said hoist reel, respective supporting members on said carcass-engaging members, respective longitudinal guide tracks mounted on the opposite sides of said first-named frame and being formed and arranged to at times supportingly engage and supporting members, and cooperating means on the first-named frame and on one of the cables formed and arranged to deenergize said last-named drive means responsive to a predetermined amount of elevation of said one of the cables relative to said band saw frame.

References Cited in the file of this patent

UNITED STATES PATENTS

| | | |
|---|---|---|
| 1,271,909 | Karhan et al. | July 9, 1918 |
| 1,855,391 | Fagande | Apr. 26, 1932 |

FOREIGN PATENTS

| | | |
|---|---|---|
| 476,218 | Canada | Aug. 21, 1951 |